Figure 1:
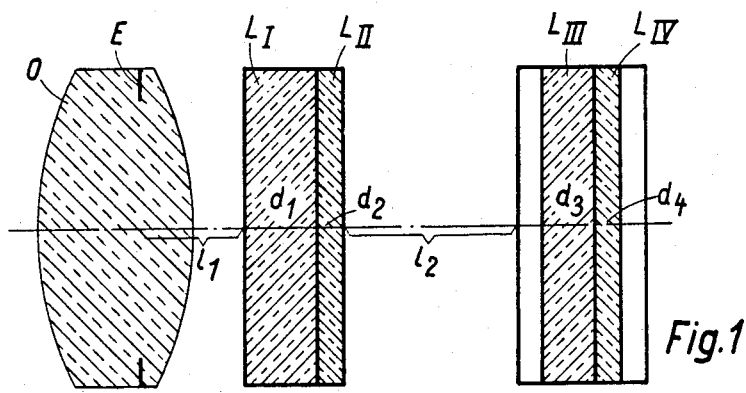

Jan. 24, 1956  H. KÖHLER ET AL  2,731,883
AFOCAL ANAMORPHOTIC CYLINDRICAL OBJECTIVE LENS SYSTEM
Filed Aug. 5, 1953

United States Patent Office 2,731,883
Patented Jan. 24, 1956

2,731,883

AFOCAL ANAMORPHOTIC CYLINDRICAL OBJECTIVE LENS SYSTEM

Horst Köhler, Heidenheim (Brenz), Wurttemberg, and Helmut Knutti, Oberkochen, Wurttemberg, Germany, assignors to Carl Zeiss, Heidenheim (Brenz), Germany Application August 5, 1953, Serial No. 372,442

Claims priority, application Germany June 20, 1953

3 Claims. (Cl. 88—57)

The present invention is relative to an afocal anamorphotic cylindrical lens system which is set up in the projection path of rays of a spherical projection and camera objective lens on the side of the longer distance between back lens and image and serves for obtaining an image sharp in all image points, of an object in the image plane of the so completed system in such a way that the linear magnification is different in two diameters of the image plane which are vertical to each other. Such an image is termed an anamorphotic image.

The production of such images has recently been met with considerable interest for several technical purposes, especially for cinematography, for the production of panoramic effects in the image projection on a projection screen. For this purpose an ancillary lens system is employed in connection with photographic objectives for the taking of motion pictures as well as for the projection of motion pictures which is afocal or almost afocal and has an anamorphotic effect. By means of such systems the picture is to be compressed in its horizontal extension when taking it and the projection is to be effected by a projection system with a similar ancillary system which in turn has the task of projecting the projection image in its original picture ratio. By employing this cinematographic photographic and projection technique it is possible to accommodate on a conventional film size pictures whose ratio between picture width and picture height is larger than the usual picture size. The projection pictures on the screen thus obtained are designed to permit a better illusion of stereoscopic picture effects than it has been the case with the picture format in the ratio of about 3:4 previously used. The aim hereby is in this manner to obtain picture extensions in the horizontal dimension of 1.5 to 2.

For the solution of this task anamorphosing cylindrical lens systems have become known which consist of a lens component positioned in front of the objective having a positive cylindrical power of refraction, and another lens component, separated from the first by air and having a negative cylindrical power of refraction the cylinder axes of these members being parallel to each other with each of said two components formed of a converging lens cemented to a diverging lens and with the cylindrical cemented surface in the diverging component having a converging effect and with its concave surface turned toward the converging component, and the cemented surface of the converging component having a diverging effect and with its converging surface turned toward the diverging component. The cylinder axes of the two components lie in vertical planes so that the system in the horizontal plane decreases the focal length of the objective while in the vertical plane the focal length remains unchanged, i. e. in the horizontal plane a change of the image scale is effected while in the vertical plane the image scale remains unchanged.

Another objective having become known up to now consists of at least five lenses the diverging components being made up of three lenses. In spite of the number of lenses and the arrangement of these known systems the projection quality, especially in respect to coma and distortion, is not satisfactory.

The object of the invention is an afocal anamorphosing cylindrical objective lens system which in the known manner also permits to carry out a projection in finite distance whereat the system is given a finite focal length in the known manner by displacing the components so that it can be used as an almost afocal system. The system of the invention is preferably used for small anamorphotic extensions, say though merely the factor 1.5, and by employing four lenses has a better correction of coma and distortion than the systems known heretofore. The attachment lens system of the invention consists of two components, of which each is made up of a cylindrical converging lens and a cylindrical diverging lens cemented together. In each said components the difference in refractive index of the cemented lenses is made larger than 0.1 and the absolute values of the radii of the cemented surfaces in each component are made between 0.35 and 0.60 of the individual focal lengths $f_1$; $f_2$ of the respective components. It is of special advantage to design the ancillary lens system according the invention in such a way that within each of the two components the absolute values of the outer radii are substantially equal whereby the absolute value of the one outer radius can be larger than the absolute value of the other radius of the same member by a maximum of 20%.

Figure 2:
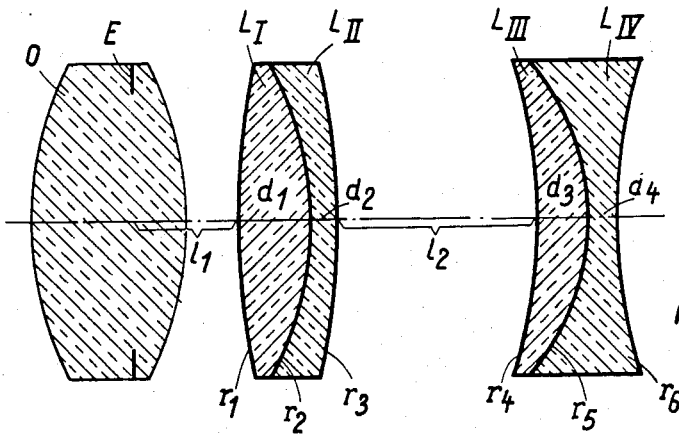

The accompanying Figures 1 and 2 of the illustrations show an example of an afocal anamorphosing cylindrical lens system of the invention with the lenses $L_I$; $L_{II}$; $L_{III}$; and $L_{IV}$, and the following table contains the numerical values for this example while Fig. 1 shows a horizontal cross-section and Fig. 2 a vertical cross-section through the entire system consisting of a photographic objective O of any construction and the afocal cylindrical lens system corresponding to the numerical values of the table. The designations are as follows:

L the individual lenses
r the radii
d the thicknesses
l the air distances
E the plane of the crossing of the main rays which in case the entire system is used as a photographic objective at the same time constitutes the exit pupil of the attachment lens system and the entrance pupil of the objective, while in case it is used as a projection objective the parts of the entrance- and exit-pupils are interchanged The other designations are:

$n_d$ the refraction indices,
$V_d$ the Abbe figures of the glasses, and
$\Delta n/r$ the powers of refraction of the individual lens surfaces

Example

| E | Radii | Thicknesses and Distances | $n_d$ | V | $\Delta n/r$ |
|---|---|---|---|---|---|
| | | $l_1=20.0$ | | | |
| $L_I$ | $r_1=+145.38$ | | | | +0.003930 |
| | | $d_1=14.0$ | 1.5714 | 53.0 | |
| | $r_2=-61.306$ | | | | −0.002559 |
| $L_{II}$ | | $d_2=5.0$ | 1.7283 | 28.3 | |
| | $r_3=-135.29$ | | | | +0.005383 |
| | | $l_2=38.5$ | | | |
| | $r_4=-100.00$ | | | | −0.007283 |
| $L_{III}$ | | $d_3=10.0$ | 1.7283 | 28.3 | |
| | $r_5=-45.316$ | | | | +0.003462 |
| $L_{IV}$ | | $d_4=5.0$ | 1.5714 | 53.0 | |
| | $r_6=+100.00$ | | | | −0.005714 |

Individual focal length of the converging component
$(L_I; L_{II})=f_1=-150.8$
Individual focal length of the diverging component
$(L_{III}; L_{IV})=f_2=+103.1$
Factor of anamorphotic extension in horizontal cross section 1.5.

Within the scope of the present invention, deviations from the values given above are permissible, e. g. for the powers of refraction ($\Delta n/r$) of the refracting surfaces ($r_1 \ldots r_6$) each by a maximum of $\pm.2/f$ with reference to the individual focal lengths ($f_1$; $f_2$) of the respective surfaces inherent in these components while deviations of the thicknesses from the given values result from the requirements of the edge sharpness of the lenses, deviations of the distance $l_1$ from the above given value from the requirements for maximum error correction and deviations of the distance $l_2$ of the value given above from the requirements for strictly afocal or almost afocal projection.

We claim:

1. An afocal anamorphosing cylindrical objective lens system to be arranged in the projection path of the rays of a spherical projection and camera objective lens and comprising respectively, a positive cylindrical lens component adjacent to the spherical lens and a diverging cylindrical lens component axially air separated apart with their cylindrical axes parallel to each other and with each of said two components formed of a converging lens cemented to a diverging lens and with the cylindrical cemented surface in the diverging component having a converging effect and with its concave surface turned toward the converging component and the cemented surface of the converging component having a diverging effect and with its converging surface turned toward the diverging component, the outer surfaces of the diverging component being turned toward its cemented surface and the outer surfaces of the converging component turned away from its cemented surface, in each said components the difference in refractive index of the cemented lenses being larger than 0.1 and the absolute values of the radii of the cemented surfaces in each component being between 0.35 and 0.60 of the individual focal lengths $f_1$; $f_2$ of the respective components.

2. An afocal anamorphosing cylindrical objective lens system to be arranged in the projection path of the rays of a spherical projection and camera objective lens and comprising respectively, a positive cylindrical lens component adjacent to the spherical lens and a diverging cylindrical lens component axially air separated apart with their cylindrical axes parallel to each other and with each of said two components formed of a converging lens cemented to a diverging lens and with the cylindrical cemented surface in the diverging component having a converging effect and with its concave surface turned toward the converging component and the cemented surface of the converging component having a diverging effect and with its converging surface turned toward the diverging component, the outer surfaces of the diverging component being turned toward its cemented surface and the outer surfaces of the converging component turned away from its cemented surface, in each of the two components the absolute values of the outer radii being substantially equal to each other, and the absolute value of the one outer radius being larger than the absolute value of the other outer radius by a maximum of 20%.

3. Ancillary lens system according to claim 1, the powers of refraction ($\Delta n/r$) of the refracting surfaces ($r_1 \ldots r_6$) deviating by a maximum of $\pm.2/f$ each, related to the individual focal lengths ($f_1$; $f_2$) of the components containing the respective surfaces, from the values contained in the following example:

Individual focal length of the converging component
$(L_I; L_{II})=-150.8$
Individual focal length of the diverging component
$(L_{III}; L_{IV})=+103.1$

| Radii | Thickness and Distance | $n_d$ | V | $\Delta n/r$ |
|---|---|---|---|---|
| | $l_1=20.0$ | | | |
| $r_1=+145.38$ | | | | +0.003930 |
| | $d_1=14.0$ | 1.5714 | 53.0 | |
| $r_2=-61.306$ | | | | −0.002559 |
| | $d_2=5.0$ | 1.7283 | 28.3 | |
| $r_3=-135.29$ | | | | +0.005383 |
| | $l_2=38.5$ | | | |
| $r_4=-100.0$ | | | | −0.007283 |
| | $d_3=10.0$ | 1.7283 | 28.3 | |
| $r_5=-45.316$ | | | | +0.003462 |
| | $d_4=5.0$ | 1.5714 | 53.0 | |
| $r_6=+100.0$ | | | | −0.005714 |

$r$ being the radii of the individual lens surfaces, $l$ the air separations, $d$ the lens thicknesses, $n_d$ the refractives indices and V the Abbe numbers, $\Delta n/r$ the power of refraction of the individual lens surfaces, $f_1$; $f_2$ the individual focal lengths of each of the two components and $L_I \ldots L_{IV}$ the individual lenses.

References Cited in the file of this patent

UNITED STATES PATENTS

| | | |
|---|---|---|
| 1,829,634 | Chretien | Oct. 27, 1931 |
| 1,938,808 | Ceccarini | Dec. 12, 1933 |
| 1,943,172 | Ford | Jan. 9, 1934 |
| 1,945,951 | Newcomer | Feb. 6, 1934 |
| 1,962,892 | Chretien | June 12, 1934 |
| 2,006,233 | Chretien | June 25, 1935 |

FOREIGN PATENTS

| | | |
|---|---|---|
| 8,512 | Great Britain | of 1898 |